US010072508B2

(12) United States Patent
Beaujard

(10) Patent No.: US 10,072,508 B2
(45) Date of Patent: Sep. 11, 2018

(54) TURBOMACHINE ROTOR WITH OPTIMISED BEARING SURFACES

(71) Applicant: SAFRAN AIRCRAFT ENGINES, Paris (FR)

(72) Inventor: Antoine Jean-Philippe Beaujard, Chevilly (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 152 days.

(21) Appl. No.: 14/979,641

(22) Filed: Dec. 28, 2015

(65) Prior Publication Data
US 2016/0186582 A1 Jun. 30, 2016

(30) Foreign Application Priority Data
Dec. 26, 2014 (FR) ...................................... 14 63350

(51) Int. Cl.
*F01D 5/32* (2006.01)
*F01D 5/30* (2006.01)
*F01D 5/02* (2006.01)
*F01D 5/12* (2006.01)

(52) U.S. Cl.
CPC ............ *F01D 5/3007* (2013.01); *F01D 5/02* (2013.01); *F01D 5/12* (2013.01); *F01D 5/3053* (2013.01); *F01D 5/3084* (2013.01); *F05D 2220/30* (2013.01); *F05D 2240/24* (2013.01); *F05D 2260/30* (2013.01); *Y02T 50/672* (2013.01)

(58) Field of Classification Search
CPC ................................. F01D 5/3007; F01D 5/323
See application file for complete search history.

(56) References Cited

U.S. PATENT DOCUMENTS

| 2,753,149 A * | 7/1956 | Kurti ....................... F01D 5/323 416/216 |
| 4,836,749 A * | 6/1989 | Gavilan ................ F01D 5/3046 416/218 |
| 5,100,292 A * | 3/1992 | Matula ...................... F01D 5/30 416/220 R |

(Continued)

FOREIGN PATENT DOCUMENTS

| EP | 0 490 522 A1 | 6/1992 |
| FR | 974 989 A | 2/1951 |
| FR | 2 971 541 A1 | 8/2012 |

OTHER PUBLICATIONS

French Preliminary Search Report dated Oct. 13, 2015 in French Application 14 63350, filed on Dec. 26, 2014 (with English Translation of Categories of Cited Documents).

*Primary Examiner* — Justin Seabe
(74) *Attorney, Agent, or Firm* — Oblon, McClelland, Maier & Neustadt, L.L.P.

(57) ABSTRACT

The invention relates to a turbomachine rotor including a disk and at least one blade wherein the root comprises a bulb accommodated into a groove associated with the disk, wherein the bulb includes a slot that opens up radially inwards at its lower face, and in that the rotor includes a retaining part extending partly into the groove projecting radially outwards from the bottom face of the groove, of which a radially outer end of the retaining part fits into the slot of the bulb and bears radially inwards on the inner wall of the slot of the bulb.

7 Claims, 1 Drawing Sheet

(56) References Cited

U.S. PATENT DOCUMENTS

| | | | |
|---|---|---|---|
| 8,734,101 B2* | 5/2014 | McDonald | F01D 9/042 415/209.4 |
| 8,764,402 B2* | 7/2014 | Agaram | F01D 5/3007 416/220 R |
| 2013/0236317 A1 | 9/2013 | Hou | |

* cited by examiner

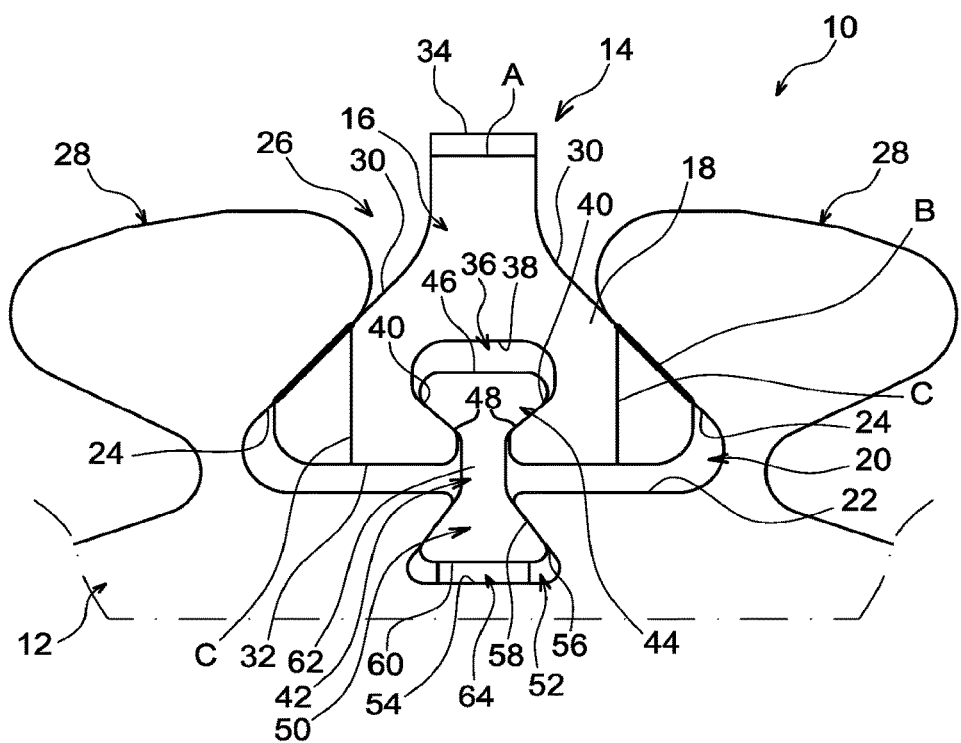

TURBOMACHINE ROTOR WITH OPTIMISED BEARING SURFACES

TECHNICAL DOMAIN

The invention relates to a turbomachine rotor comprising a rotor disk and at least one blade, for example for an aircraft turbomachine, made so as to limit stresses due to pressures on the root of the blade.

STATE OF PRIOR ART

According to one known embodiment, a turbomachine blade is connected to the rotor disk at its radially inner root that comprises a bulb-shaped portion that fits into an associated groove formed in the periphery of the rotor disk.

The disk comprises a series of blade retaining teeth that delimit adjacent grooves.

Cooperation between the bulb and the groove holds the blade connected to the disk, despite forces generated by centrifugal action when the rotor rotation speed is high.

The bulb is subjected to compression stresses at the bearing faces between the groove and the bulb, shear stresses generated on each side of the bulb as a result of bearing forces between the groove and the bulb, and tensile stresses located at the connection between the bulb and the remainder of the root of the blade.

It has been proposed that high pressure and low pressure turbine blades can be made of Ceramic Matrix Composite (CMC) to improve the efficiency of the turbomachine. Such blades have the advantages that their mass is lower and that they have better resistance to combustion gases circulating at high temperature through the turbine, that come into contact with the blades.

Moreover, a blade made of Ceramic Matrix Composite is installed on a metal rotor disk. These two materials have different expansion coefficients, which can consequently generate additional stresses on the blade, or internal clearances due to the different expansions of the components as the temperature varies in the turbomachine.

The lateral dimensions of the bulb are relatively high so that the blade can resist these stresses. Consequently, the lateral dimensions of the associated groove are also high, which limits the quantity of material available for mechanical strength of the disk teeth.

The purpose of the invention is to disclose a turbomachine rotor comprising a disk and at least one blade made such that the bulb of the blade can resist all stresses applied to it, while maintaining sufficient strength of the disk teeth.

PRESENTATION OF THE INVENTION

The invention discloses a turbomachine rotor comprising a disk and at least one blade wherein the root of the blade comprises a bulb accommodated into an associated groove of the disk, the groove comprising a radially inner bottom face and two faces overhanging the bottom face, that are inclined relative to the median plane of the groove, the bulb comprising two radially outer upper faces located facing the overhanging faces of the groove, that are inclined relative to the main plane of the bulb and that are bearing radially outwards on said overhanging faces, and comprising a lower face located radially facing and at a distance from the bottom face of the groove, characterised in that the bulb comprises a slot that opens up radially inwards at the lower face of the bulb, and in that the rotor comprises a retaining part extending partly into the groove projecting radially outwards from the bottom face of the groove, of which a radially outer end of the retaining part fits into the slot of the bulb and bears radially inwards on the inner wall of the slot in the bulb.

Radial bearing of the retaining part in contact with the inner wall of the slot can increase the bulb bearing area without the need to increase the lateral dimensions of the bulb. Thus, such an arrangement can reduce the dimensions and the mass of the bulb.

Preferably, the slot of the bulb includes a bottom face parallel to and located at a distance from the lower face of the bulb and two inclined faces that are inclined relative to the median principal plane of the groove and that extend from the ends of the bottom face of the slot to the lower face of the bulb.

Preferably, the outer radial end of the retaining part comprises bearing faces located facing inclined faces of the slot in the bulb, that are bearing radially inwards on said inclined faces.

Preferably, the disk comprises a slot that opens up radially outwards at the bottom face of the groove, inside which a radially inner end of the retaining part fits, bearing radially outwards on the inner wall of said slot.

Preferably, the slot formed in the disk comprises a bottom face parallel to and located at a distance from the bottom face of the groove and two inclined faces that are inclined relative to the median principal plane of the groove and that extend from the ends of the bottom face of the slot to the bottom face of the groove.

Preferably, the radially inner end of the retaining part comprises bearing faces facing the inclined faces of the slot formed in the disk, that are bearing radially inwards on said inclined faces of the slot.

Preferably, the rotor comprises means of adjusting the radial position of the retaining part relative to the disk.

Preferably, the rotor comprises at least one element to compensate for radial clearance formed between the retaining part and a facing face of the slot formed in the disk.

The invention also relates to an aircraft turbomachine comprising a rotor according to the invention provided with at least one disk with blades connected to the disk.

BRIEF DESCRIPTION OF THE DRAWINGS

Other characteristics and advantages of the invention will become clear after reading the following detailed description given with reference to the single FIGURE that shows a sectional view through a disk and a blade of a rotor assembled according to the invention, to facilitate understanding.

DETAILED PRESENTATION OF PARTICULAR EMBODIMENTS

The single FIGURE shows a rotor 10 of an aircraft turbomachine, particularly for the low pressure turbine or the high pressure turbine of the turbomachine.

The rotor 10 comprises a rotor disk 12 that consists of an element of revolution, and a plurality of blades 14 distributed around the circumference of the rotor disk 12. In this case, only one blade 14 has been shown partially, but it will be understood that the following description is applicable in exactly the same way for the other blades.

The principal orientation of the blade 14 is radial from the principal axis of the rotor that is also the principal axis of the disk 12. The blade comprises a radially inner end 16 commonly called the "root" at which the blade 14 is mounted on the disk 12.

The root 16 of the blade 14 comprises a connecting portion called the bulb 18, that fits into an associated groove 20 formed at the periphery of the disk 12.

The groove 20 and the bulb 18 have similar shapes and the bulb 18 bears radially outwards on the groove 20 to hold the blade 14 radially in position on the disk 12.

The groove 20 is delimited by a radially inner bottom face 22 and two faces 24 overhanging the bottom face 22 and that are inclined relative to a median plane of the groove. The overhanging faces 24 extend globally from the ends of the bottom face 22 to the outer radial opening 26 of the groove located on the peripheral edge of the disk 12.

Since the rotor disk 12 will hold several blades 14, it comprises several identical grooves 20 distributed around its entire periphery. Two adjacent grooves 20 are thus separated from each other by a portion of the disk 12 called the tooth 28.

The bulb 18 comprises two radially outer upper faces 30 that are inclined relative to the median principal plane of the groove 20 at the same angle as the overhanging faces 24 of the groove 20, in other words, they are parallel to the overhanging faces 24 of the groove 20. The upper faces 30 of the bulb 18 are located facing the overhanging faces 24 of the groove 20 and bear radially outwards on the overhanging faces 24 of the groove 20.

The bulb 18 also comprises a lower face 32 that is located radially facing and at a distance from the bottom face 22 of the groove 20.

The bulb 18 is connected to the remainder of the blade 14 at its upper end 34 that has a small cross-section.

As the disk rotates, when the turbomachine is in operation, centrifugal forces applied on the blade 14 create stresses applied on the bulb 18, consisting of a tensile stress oriented along the radial direction that is the highest at the upper end 34 of the bulb 18 (line A); a compression stress located at the facing bearing faces 24, 30 of the bulb 18 and of the groove 20 (lines B); and a radial shear stress at the end of the bearing surface B closest to the median principal plane of the groove 20 (lines C).

The rotor 10 also comprises a slot 36 made in the bulb 18, that opens up radially inwards at the bottom face 32 of the bulb 18. This slot 36 is delimited by a bottom face 38 that is parallel to and radially offset outwards from the lower face 32 of the bulb 18, and by two faces 40 inclined relative to the principal median plane of the slot 36 that extend from the ends of the bottom face 38 as far as the lower face of the bulb 18.

The rotor 10 also comprises a retaining part 42 connected to the disk 12 and that extends projecting radially outwards from the bottom face 22 of the groove 20, and the outer radial end 44 of the retaining part 42 fits inside the slot 36.

The shape of the outer end 44 of the retaining part 42 is similar to the shape of the slot 36 and consequently comprises an outer radial end face 46 that is parallel to and at a radial distance from the bottom face 38 of the slot 36 and two inclined faces 48 that are parallel to and bear on the inclined faces of the slot 36.

Consequently, the bulb 18 also bears radially outwards on the outer end 44 of the retaining part 42. This additional bearing reduces compression stresses at the facing bearing faces 24, 30 of the bulb 18 and of the groove 20 because the global bulb bearing area is larger due to the presence of the facing bearing faces 40, 48 of the groove 36 and of the outer end 44 of the retaining part 42.

In this case, the retaining part 42 is an element added on the disk 12. According to one variant embodiment, the retaining part is made in a single part with the disk 12, and is formed at the same time as the groove 20 is being machined.

The retaining part 42 is connected to the disk 12 through its radially inner end 50 that fits into an associated slot 52 formed in the disk 12. This slot 52 opens up radially into the bottom face 22 of the groove 20, and comprises a bottom face 54 parallel to the bottom face 22 of the groove 20 and two bearing faces 56 overhanging the bottom face 54.

The inner radial end 50 of the retaining part 42 is shaped like a bulb and comprises two inclined bearing faces 58 that are parallel to and in contact with the bearing faces 56 of the slot 52 and an inner radial end face 60 that is facing the bottom face 54 of the slot 52 and is at a distance from it.

The two radial ends 44, 50 of the retaining part 42 are connected by a radial portion 62 that is narrow as can be seen in the drawing.

The rotor 10 also comprises a compensation shim 64 to compensate for clearances between the inner radial end 50 of the retaining part and the slot 52.

The bearing faces 40, 48 of the retaining part 42 with the slot 36 in the bulb 18 are located between the facing bearing faces 24, 30 of the bulb 18 and the groove 20, and are also located at approximately the same radial location as the facing bearing faces 24, 30 of the bulb 18 and the groove 20.

Such an arrangement of the various bearing faces makes it possible to have a bulb 18 with conventional dimensions, particularly when the blade 14 is made from a CMC (Ceramic Matrix Composite) material, for which the infiltration thickness of the material is limited. There is no excessive overthickness of the root 16 of the blade 14. Thus, it is easier to make this root 16, particularly in the case of a Ceramic Matrix Composite blade. It will be understood that the invention is not only applicable to a blade made from a Ceramic Matrix Composite material and that the blade 14 may also be made from a nickel-based alloy or it could be a monocrystalline blade.

The bulb 18 and the groove 20 of the disk both extend axially along the total axial length of the disk 12. All the components in the rotor 10, namely the slots 36, 52, the retaining part 42 and the compensation shim 64 also extend along the total axial length of the disk 12 and they are preferably symmetric with the median principal plane of the groove 20.

The different bearing faces of the rotor 10 are approximately located at the same radial position from the principal axis of the disk 12. The temperatures of the various components are approximately the same at this radial position. Consequently, there is little or no differential expansion for each of these various components, unlike previous connection types, for example a fir tree type attachment that is longer in the radial direction.

The rotor 10 also comprises means (not shown) for blocking these components in position along the axial direction, from the disk 12.

The invention claimed is:

1. A turbomachine rotor comprising a disk and at least one blade, wherein the root of the blade comprises a bulb accommodated into an associated groove of the disk, the groove comprising a radially inner bottom face and two faces overhanging the bottom face, that are inclined relative to a median plane of the groove, the bulb comprising two radially outer upper faces located facing the overhanging faces of the groove, that are inclined relative to a main plane of the bulb and that are bearing radially outwards on said overhanging faces, and comprising a lower face located radially facing and at a distance from the bottom face of the groove, wherein the bulb comprises a slot that opens up radially inwards at the lower face of the bulb, and the rotor comprises a retaining part extending partly into the groove projecting radially outwards from the bottom face of the groove, of which a radially outer end of the retaining part fits into the slot of the bulb and bears radially inwards on the inner wall of the slot of the bulb, wherein the slot of the bulb and the retaining part are parallel to an axial direction of the groove of the disk, and wherein the disk comprises a slot that opens up radially outwards at the bottom face of the groove, inside which a radially inner end of the retaining part fits, bearing radially outwards on an inner wall of said slot, and wherein the slot formed in the disk comprises a bottom face parallel to and located at a distance from the bottom face of the groove and two inclined faces that are inclined relative to the median plane of the groove and that extend from the ends of the bottom face of the slot to the bottom face of the groove.

2. A rotor according to claim 1, wherein the slot of the bulb comprises a bottom face parallel to and located at a distance from the lower face of the bulb and two inclined faces that are inclined relative to the median plane of the groove and that extend from the ends of the bottom face of the groove to the lower face of the bulb.

3. A rotor according to claim 2, wherein the outer radial end of the retaining part comprises bearing faces located facing inclined faces of the slot of the bulb, that are bearing radially inwards on said inclined faces.

4. A rotor according to claim 1, wherein the radially inner end of the retaining part comprises bearing faces facing the inclined faces of the slot formed in the disk, that are bearing radially inwards on said inclined faces of the slot.

5. A rotor according to claim 1, further comprising means of adjusting the radial position of the retaining part relative to the disk.

6. Rotor according to claim 5, wherein said means of adjusting comprises at least one element to compensate for radial clearance formed between the retaining part and a facing face of the slot formed in the disk.

7. Aircraft turbomachine comprising a rotor according to claim 1, provided with at least one disk with blades connected to the disk.

\* \* \* \* \*